3,308,158
DIAMINO-POLYCHLORODIPHENYL COMPOUNDS
Laszlo Szobel, Grenoble, Isere, and Ludovic Parvi, Pont-de-Claix, Isere, France, assignors to Societe d'Electro-Chimie, d'Electro-Metallurgie et des Acieres Electriques d'Ugine, Paris, France, a corporation of France
No Drawing. Filed June 6, 1963, Ser. No. 285,869
Claims priority, application France, June 7, 1962, 899,999
6 Claims. (Cl. 260—570.5)

This invention relates to industrial products formed by the biaminated derivatives of the polychlorodiphenyls, having the following general formula:

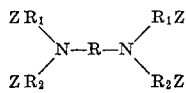

in which:

R is a diphenyl radical containing more than 4 atoms of chlorine,
N represents an amine function fixed to the radical R and is one of primary, secondary or tertiary,
$R_1Z$ and $R_2Z$ are selected from the group consisting of an atom of hydrogen and of a functional group formed by a radical $R_1$ or $R_2$, which is one of aliphatic, saturated or unsaturated, cylic or heterocyclic,
Z represents a terminal group selected from the group consisting of —OH, —$NH_2$, —NH—, —COOH, —$CH_3$, —Cl, —Br, —$CH_2$, cyclic, heterocylic groups.

The invention includes a compound of the formula

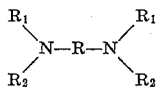

in which R is a diphenyl radical containing from 6 to 8 chlorine atoms and $R_1$ and $R_2$ are selected from the group consisting of hydrogen, alkyl radical having from 2 to 8 carbon atoms, hydroxy lower alkyl radical, allyl, benzyl, —$(CH_2)_n$—[NH—$(CH_2)_n]_m$—$NH_2$, in which $n$ is between 2 and 6 and $m$ is between 0 and 3, not more than one of $R_1$ and $R_2$ being hydrogen.

If a diphenyl containing $n$ atoms of chlorine is used as the initial material, the products of the invention contain $n-2$ atoms of chlorine. The self-extinguishing quality of the products of the invention becomes progressively more pronounced as the number $n$ approaches 10.

The products of the invention are characterized by the existence of two amine functions substituted directly on the radical R.

The selection of the radicals $R_1$ and $R_2$ which may be identical, and/or of the terminal group Z, renders it possible to endow the products of the invention with the polyfunctional nature desired, and to arrive at polyfunctional polychlorodiphenyls which form interesting starting materials. They may be used in the production of polyethers, polyesters, polyamides, isocyanates, etc. They may form curing agents for epoxide resins, plastifiers, modifiers or adjuvants for plastic materials. The products, in the composition of which are used the biaminated derivatives, according to the invention, possess the quality of being hardly inflammable, and even self-extinguishing, if the chlorine amount is sufficient. From the products: polyethers, polyesters, isocyanates, which may be prepared from the biaminated derivatives of the invention, one obtains a whole range of highly flame-resistant polyurethanes, and even self-extinguishing polyurethanes according to their chlorine percentage.

The products in which Z represents an amine group form an interesting curing agent for epoxide resins and endow them with flame-resistant and self-extinguishing properties by virtue of their highly chlorinated molecule. These products, being compatible with halogenated plastic materials such as polyvinyl chloride, polyvinylidene chloride and their copolymers, act as stabilizers for these resins due to their capacity of fixing the hydrochloric acid released during the aging of these materials.

The products in which Z is a hydroxyl or carboxyl group may serve as initial materials for the production of hardly inflammable or even self-extinguishing polyesters. Being compatible with styrene, as well as with the usual di-acids customarily employed in the production of polyesters themselves (such as succinic, maleic, phthalic and adipic acids), and with the dialcohols used for the same purpose (such as glycols), with polyesters and polyethers themselves, they may be used as such or intermixed with each other, with different types of products in order to improve their resistance against flames and to endow them with specific properties.

If $R_1$ and/or $R_2$ represent a radical containing unsaturated atoms of carbon, Z optionally being formed for example by a hydroxyl or carbonyl group, the double bond offers the possibility of creating novel molecules.

The various applications which have been listed are not limiting but merely indicate the great possibilities offered by the biaminated derivatives of the polychlorodiphenyls.

Of the many initial polychlorodiphenyls which may be employed to prepare the novel industrial products according to the invention, one may more specifically use decachlorodiphenyl which is obtained in satisfactory economical circumstances according to the process which is the object of French Patent 1,229,815 of March 10, 1959.

The novel products according to the invention are obtained by causing an amine compound containing the radicals $R_1Z$ and/or $R_2Z$ to react with polychlorodiphenyl under strong agitation.

The reaction is carried out either in a medium formed by the amine itself or by the solution of said amine in water, or in another inert solvent.

The temperature essentially depends on the amine employed, and amounts to between 70° C. and 300° C. For the majority of the amines selected, it amounts to between 100° C. and 200° C.

The pressure will also depend on the nature of the amine used. It may according to the case be lower than, equal to or higher than atmospheric pressure.

For certain amines, it is advantageous to employ catalysts such as iron or copper salts.

As a rule, operating conditions are those which govern the reaction of the amine group with the chlorine linked to the core. One may advantageously employ amine compounds in excess as compared to stoichiometrical quantity.

After the reaction, the resulting mixture is processed with the object of separating the product formed and of a contingent recovery of the solvent according to known methods. For example, in the case in which the solvent is soluble in water, which is the case as a rule if amines are used as solvents, the mixture resulting from the reaction is poured into the quantity of water required to precipitate the substituted polychlorodiphenyl which as a rule has a low solubility or is insoluble in it. In other cases, the compound produced is separated by distillation or by any other conventional method.

The following non-limiting examples exemplify the invention. They cover the utilization of decachlorodiphenyl and of chlorodiphenyl containing 66.9% of chlorine. It is evident that less highly chlorinated polychlorodiphenyls can be used, but they must contain more than 4 atoms of chlorine per molecule.

The polychlorodiphenyls may be formed by precisely defined types, according to the position of chlorine atoms on the core, as well as by their various isomers, whether used alone or intermixed.

*Example 1*

100 g. of ethyl alcohol, 100 g. of decachlorodiphenyl and 140 g. of liquid ammonia were introduced into a stainless steel autoclave. Heating was performed gradually under agitation and autogenous pressure up to 280° C., which temperature was maintained for 5 hours. After cooling of the autoclave and the elimination of the excess ammonia, the reaction product was drained, washed with water and then dried.

A crude octochlorodiaminodiphenyl which was obtained was dissolved in 800 cc. of hot concentrated sulphuric acid. The sulphuric solution was subsequently cooled, then filtered and carefully poured into 8 liters of water. The purified octochlorodiaminodiphenyl precipitated was drained, washed with water and then dried.

86 g. of the product was obtained, which corresponds to a yield of 93.3% compared to the decachlorodiphenyl utilized.

This product melted between 282° C. and 289° C.

The nitrogen content amounted to 6.0%, compared to the theoretical percentage of 6.1%.

*Example 2*

A mixture of 800 cc. of ethylenediamine and 250 g. of decachlorodiphenyl was heated under reflux conditions (117° C.) for two hours. The reaction product was subsequently cooled and then poured into two liters of water. A white precipitate was formed which by heating at 90° C. agglomerated into a viscous product. This resin was washed several times with hot water in order to assure complete elimination of residual ethylenediamine. After drying, 265 g. of NN'-bis(ethyl 2-amino) diaminooctochlorodiphenyl was obtained in the form of a resinous product, hard in the cold state but becoming fluid towards 110° C.–115° C.

The determination of the amine groups was performed in alcoholic solution with an acid and showed that the product corresponds to a molecular equivalent of 274 compared to a theoretical equivalent of 273.

*Example 3*

A mixture composed of 150 g. diethylenetriamine and 12.5 g. of decachlorodiphenyl was heated at 130° C. for three hours. After the reaction, the reactive solution was poured into 500 cc. of hot water. A viscous resin which precipitated was washed several times with hot water by decanting and then dried. 14.5 g. of NNN' N'-tetrakis (ethyl 2-amino)-diaminooctochlorodiphenyl was obtained in the form of a brittle solid at ambient temperature and becoming fluid around 100° C.

Acidimetrical determination of the amine groups showed a molecular equivalent of 160.5 for an equivalent (theoretical) of 158.

*Example 4*

A mixture of 500 g. of decachlorodiphenyl and 1600 cc. of ethanolamine was heated under reflux conditions at 170° C. for 8 hours. After a reaction, the mixture was poured into two liters of water. The NN'-bis(ethane 2-ol)diaminooctochlorodiphenyl which precipitated was filtered, washed with water and then dried. 538 g. of the product was obtained, which represented a yield of 98.1%, in comparison with the decachlorodiphenyl utilized.

The product melted at 63° C.–70° C. and contained:
Nitrogen—5.10%, compared to the theoretical percentage of 5.11%
Chlorine—50.5%, compared to the theoretical percentage of 51.1%.

*Example 5*

A mixture of 10 g. of decachlorodiphenyl and 160 cc. of diethanolamine was heated at 200° C. for 8 hours. The reactive mass was cooled to ambient temperature, then poured into an aqueous solution of soda at 10%. The precipitate formed was washed with water. After drying, 12.1 g. of NNN'N'-tetrakis(ethane 2-ol)diaminooctochlorodiphenyl was obtained which corresponds to a yield of 95.3%, in comparison with the decachlorodiphenyl utilized.

The resinous product softened at about 105° C. It contained:

Nitrogen—4.30%, compared to the theoretical percentage of 4.40%
Chlorine—44.40%, compared to the theoretical percentage of 44.60%.

*Example 6*

70 g. of hexamethylene diamine into which 10 g. of decachlorodiphenyl was introduced, was heated at 150° C.–160° C. At the end of ½ hour of reaction, the mixture became clear. It was kept at 155° C. for another 3 hours, then cooled to 90° C. and subsequently poured into water. The precipitated product was washed several times with water, by decanting, and dried.

12.5 g. of NN'-bis(hexyl 6-amino)diaminooctochlorophenyl was obtained, which corresponds to a yield of 95.4% in comparison with the decachlorodiphenyl utilized.

The acidimetrical determination in alcoholic solution of the amine groups gave a molecular equivalent of 333, compared to a theoretical equivalent of 329.

*Example 7*

A mixture composed of 65 g. of benzylamine and 10 g. of decachlorodiphenyl was heated under reflux conditions at 185° C. for 8 hours. The solution obtained was cooled and then poured into water under strong agitation. The precipitated product was washed several times by decanting with hot water (95° C.) and then dried.

11 g. of NN'-dibenzyl-diaminooctochlorodiphenyl was obtained, which represented a yield of 85.9% in comparison with the decachlorodiphenyl utilized. It contained:

Nitrogen—4.25%, compared to the theoretical percentage of 4.37%
Chlorine—43.9%, compared to the theoretical percentage of 44.4%.

*Example 8*

150 g. of piperazine containing 20% of water and 10 g. of decachlorodiphenyl was heated at 125° C. under reflux conditions for 9 hours. The reactive solution was filtered and then poured into water. The precipitate formed was drained, washed with water and dried. 12 g. of octochlorodipiperazinediphenyl was thus obtained, which corresponds to a yield of 100% in comparison with the decachlorodiphenyl utilized.

The product melted at 110° C.–115° C. and contained:

Nitrogen—9.36%, compared to the theoretical percentage of 9.18%
Chlorine—47.6%, compared to the theoretical percentage of 47.4%.

*Example 9*

A mixture of 12.5 g. of decachlorodiphenyl and 250 g. of triethylene tetramine was heated at 160° C. for 3 hours. The reactive mass was poured into hot water and a viscous resin precipitated, which was washed with hot water, then decanted and dried under reduced pressure 12.1 g. of octochloro-bis(triethylene tetramine)diphenyl was obtained, which corresponds to a yield of 67.2% in comparison with the decachlorodiphenyl utilized.

The acidimetrical determination of the amine groups gave a molecular equivalent of 185 compared to a theoretical equivalent of 179.

The product contained:

Nitrogen—14.8%, compared to the theoretical percentage of 15.58%

Chlorine—37.5%, compared to the theoretical percentage of 39.5%.

*Example 10*

A mixture composed of 44 g. of chlorinated diphenyl containing 66.9% of chlorine, and of 160 cc. of ethanolamine, was heated under reflux conditions at 170° C.–175° C. for 8 hours.

46 g. of NN'-bis(ethane 2-ol)diaminohexachlorodiphenyl was obtained, which contained:

| | Percent |
|---|---|
| Nitrogen | 5.55 |
| Chlorine | 45.7 |

*Example 11*

A mixture formed of 630 g. of 2-ethylhexylamine and 160 g. of decachlorodiphenyl was heated under reflux conditions (168° C.) for 2½ hours. The reaction product was subsequently cooled, then poured into 4000 cc. of hydrochloric acid solution at 20%. A white precipitate formed and it was washed by a hydrochloric acid solution at 5%, then processed with ammonia and washed several times with water. After drying, 203 g. NN' - bis(-2-ethylhexyl)diaminooctochlorodiphenyl was obtained, which corresponds to a yield of 92.8%.

The product contained:

Nitrogen—3.95%, compared to the theoretical percentage of 4.09%

Chlorine—41.70%, compared to the theoretical percentage of 41.50%.

*Example 12*

10 g. of decachlorodiphenyl and 22.5 g. of allylamine were introduced into a glass-tube of 45 cc. closed hermetically. Heating was performed gradually up to 170° C. and this temperature was maintained for 2 hours. The reaction product was poured into 400 cc. of cold water. A pasty and slightly brownish precipitate which formed was washed with water several times. After drying, 9.5 g. of octochloro-bis(allylamine)diphenyl was obtained, which corresponds to a yield of 88%.

The product contained:

Nitrogen—4.85%, compared to the theoretical percentage of 5.18%

Chlorine—52.10%, compared to the theoretical percentage of 52.60%

Iodine index—89, compared to the theoretical iodine index of 94.

*Example 13*

A mixture of 126 g. of 2-amino 2-methyl, 1.3-propanediol and 20 g. of decachlorodiphenyl was heated at 200° C. for 20 hours. The reaction product was then cooled, and poured into 700 cc. of water. A precipitate which formed was washed with water, drained and processed in the cold state by methanol, at the rate of 8.5 cc. of alcohol per gram of crude product.

After draining and drying 5 g. of a solid product which had a melting point of 302° C. and which was formed of unconverted decachlorodiphenyl was obtained. The methanolic solution was evaporated to the dry state and gave 17.8 g. of octochloro-bis(2-amino 2-methyl, 1.3-propanediol)diphenyl, which corresponds to a yield of 93.3% in comparison with the decachlorodiphenyl utilized.

The product melted at 120° C.–125° C. and contained:

Nitrogen—4.25%, compared to the theoretical percentage of 4.40%

Chlorine—45.10%, compared to the theoretical percentage of 44.60%.

*Example 14*

A mixture of 100 g. of decachlorodiphenyl and 375 cc. of N-methylethanolamine was heated under reflux conditions at 163° C. for 7 hours. After reaction, the mixture was poured into 500 cc. of water. The octochloro-bis(N-methylethanolamine)diphenyl which was obtained, was washed several times with water, precipitated and dried. The 114 g. of this product which was collected represents a yield of 99% in comparison with the decachlorodiphenyl utilized.

The product contained:

Nitrogen—4.85%, compared to the theoretical percentage of 4.86%

Chlorine—48.70%, compared to the theoretical percentage of 49.30%.

While we have shown and described preferred embodiments of our invention, it may be otherwise embodied within the scope of the appended claims.

We claim:
1. A compound of the formula

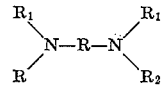

in which R is a diphenyl radical containing from 6 to 8 chlorine atoms and $R_1$ and $R_2$ are selected from the group consisting of hydrogen, alkyl radical having from 2 to 8 carbon atoms, hydroxy lower alkyl radical, allyl, benzyl, —$(CH_2)_n$—$[NH$—$(CH_2)_n]_m$—$NH_2$, in which $n$ is between 2 and 6 and $m$ is between 0 and 3, not more than one of $R_1$ and $R_2$ being hydrogen.

2. NN'-bis(ethyl 2-amino)diaminooctochlorodiphenyl.
3. NN'-bis(ethane 2-ol)diaminooctochlorodiphenyl.
4. NN'-dibenzyl-diaminooctochlorodiphenyl.
5. Octochloro-bis(allylamine)diphenyl.
6. Octochloro-bis(N-methylethanolamine)diphenyl.

References Cited by the Examiner

UNITED STATES PATENTS 2,829,164  4/1958  Rocklin  260—570.5

FOREIGN PATENTS 1,000,998  1/1957  Germany.
1,098,124  Germany.

OTHER REFERENCES

White et al.: "Journal American Chemical Society," vol. 54, pages 2105, 2107 and 2108 (1932).

CHARLES B. PARKER, *Primary Examiner.*

JOSEPH P. BRUST, *Examiner.*

ROBERT V. HINES, *Assistant Examiner.*